Patented Aug. 9, 1938

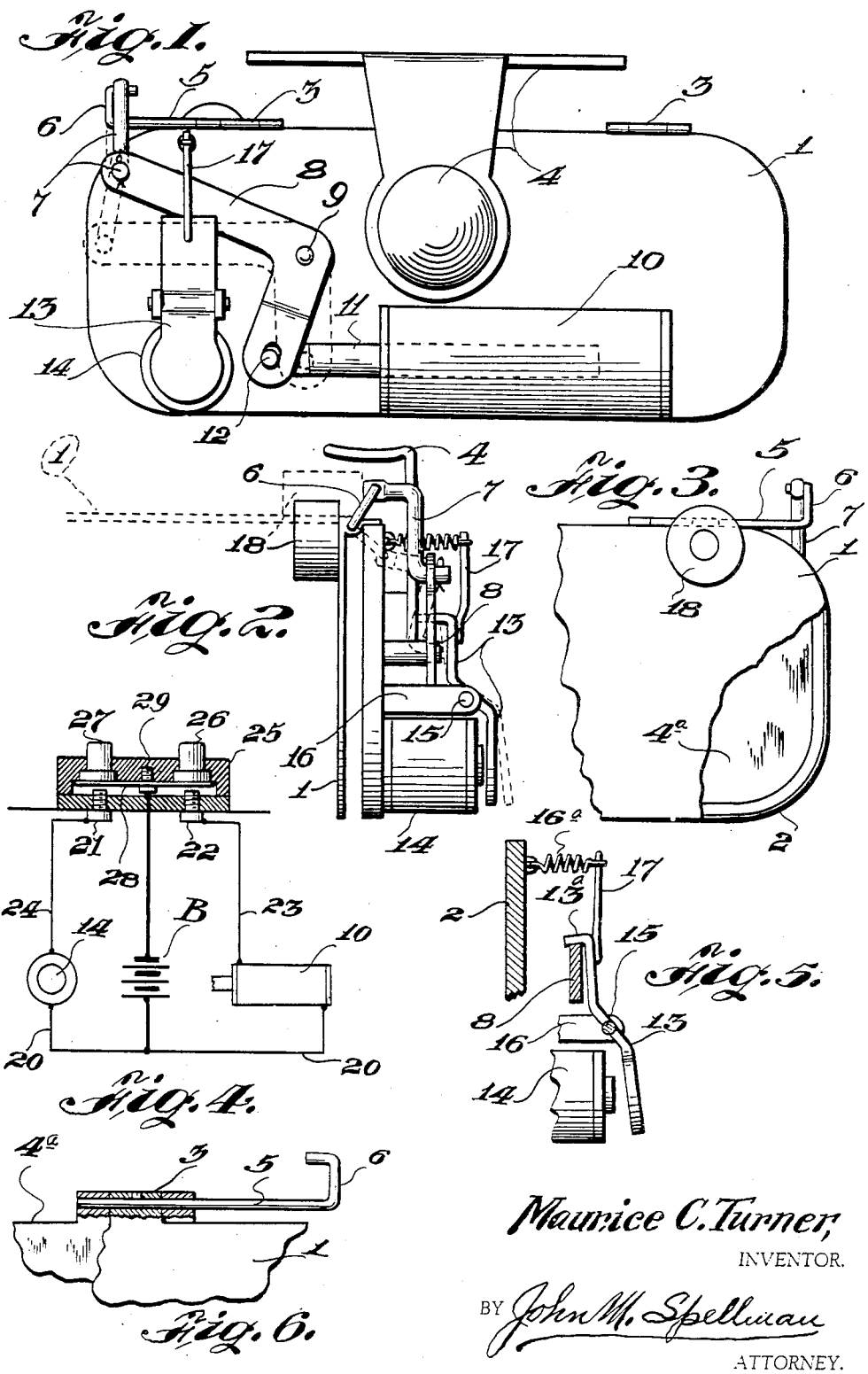

2,126,059

UNITED STATES PATENT OFFICE 2,126,059

CAR MIRROR

Maurice C. Turner, Dallas, Tex.

Application August 4, 1937, Serial No. 157,357

2 Claims. (Cl. 88—77)

This invention relates to automobile accessories and the principal object of the invention is the production of a cover for the mirror which reflects objects to the rear of the driver. The glare of lights from vehicular traffic approaching from the rear causes annoyance and sometimes confusion and results in unnecessary hazard.

The invention resides in the provision of a cover for the rear view mirror which operates through an electric battery together with certain electrical instrumentalities in one form of its application, and through the suction of air through the carbureter with certain mechanisms to bring about a lifting and lowering effect of the cover, through the application of another form of the invention.

The invention will be clearly understood from a perusal of the following detailed description, taken in connection with the drawing accompanying this specification, and in the drawing:

Figure 1 is a rear elevational view of a mirror frame, connection bracket, and showing the means for raising and lowering the cover, Figure 2 is an end elevational view of Figure 1, the broken lines showing open position of the cover, Figure 3 is a fragmentary view taken from the front with cover partly broken away, Figure 4 is a diagrammatical view of the wiring and switch control, Figure 5 is a detail of the means for holding the cover in raised position, and Figure 6 is a sectional detail view of the cover and mirror, with cover raising and lowering parts.

Referring more in detail to the drawing, Figure 1 represents the rear side of the mirror frame, the cover 1 being hinged to the frame 2 by hinges 3. A bracket 4 connects the mirror frame to the vehicle and a mirror is indicated at 4—a.

One of the hinges 3 has its connecting pin 5 extended and formed into a hook 6, see Figure 6. This hook is pivotally connected to a crank rod 7 which rod 7 in turn is connected in a similar manner to a lever 8. The lever 8 is loosely mounted as at 9 to the back of the mirror frame 2. This will be clearly apparent from Figures 1 and 2. A solenoid 10 has its plunger rod 11 pivoted to the lever 8 at the point 12. This solenoid 10 in connection with the lever 8 and connecting parts, raises the mirror cover 1, as will be hereinafter particularly pointed out. When in raised position, shown by dotted lines, Figure 2, the cover is held in such position by the armature 13 of an electro-magnet 14. This armature is pivoted at 15 to a support 16 and a spring 16—a on the pin 17 pulls the armature over the edge of the lever 8, when the armature is released from the magnet. A weight 18 assists in aiding the return of the cover to closed position.

The solenoid and electro-magnet are connected into the electric circuit of a battery B by the wires 20 or may be grounded to the vehicle body. The other side of the circuit is connected to the contact points 21 and 22 by the wires 23 and 24. A switch box 25 has two buttons 26 and 27 and a spring switch blade 28, is rigidly fastened at 29 to the box 25.

In the operation of the cover arrangement shown in Figures 1 to 6, inclusive, manual pressure on the button 26 will obviously cause the current to flow to the solenoid 10, whereupon the plunger 11 will be drawn inwardly of the coil as shown by the broken lines. The lever 8 thus moved, pulls down on the crank rod 7 and raising the cover 1. As the cover is thus raised and as shown in Figure 5, the edge of the lever 8 comes under the bent-over end 13—a of the armature and the cover is held in raised position. To release and lower the cover the button 27 is pressed, and this closes the circuit through the electro-magnet 14. Attraction of the armature to the coil pulls the end 13—a from contact with the lever 8 and the cover falls to closed position.

It should be understood that the cover may be modified to some extent in keeping with the spirit and intent of the invention and be within the scope and meaning of the claims appended hereto.

What is claimed as new is:

1. In combination with a rear view mirror, its frame and back, of a cover for the mirror, a solenoid and an electro-magnet being in an electrical circuit, switch means for connecting said solenoid and switch means for connecting said magnet on opposite sides of said circuit and within the circuit, means for connecting the plunger of the solenoid to the cover to raise the cover when the circuit is closed on the side of the solenoid, the armature of the electro-magnet cooperating with the connecting means for the solenoid plunger and the said cover for the rear view mirror to hold the cover in raised position then when the other side of said circuit is closed to energize the electro-magnet so that its armature releases said connecting means for the solenoid plunger and the said cover thereby releasing the said cover for the rear view mirror from the said raised position.

2. In combination with a rear view mirror, its frame and back, of a cover for the mirror, a solenoid and an electro-magnet being in an electrical circuit, switch means for connecting said solenoid and switch means for connecting said magnet on opposite sides of said circuit and within the circuit, means for connecting the plunger of the solenoid to the cover for the rear view mirror to raise the cover when the circuit is closed on the side of the solenoid, the said connecting means for the plunger of the solenoid and the cover of the rear view mirror comprising a crank lever pivoted to the back of the frame, one end of said lever having a loose pivoted connection with the plunger of the solenoid and its opposite end connected to a second crank lever, the second mentioned crank lever having a pivoted connection with said cover, the armature of said electro-magnet having a bent portion at one end for co-operating with the first mentioned crank lever to hold the cover in raised position, then when the other side of said circuit is closed to energize the electro-magnet so that the bent portion of the armature releases the first mentioned crank lever thereby releasing the said cover for the rear view mirror from the said raised position.

MAURICE C. TURNER.